United States Patent [19]
Drewry et al.

[11] Patent Number: 5,487,155
[45] Date of Patent: Jan. 23, 1996

[54] DATA SWITCH WITH MULTIPLEXERS FOR FORMING DATA CONNECTIONS AND CONTROL UNIT FOR CHECKING PERMISSIBILITY OF CONNECTIONS

[75] Inventors: John R. Drewry, Stockport; Michael Collins, Withington; Ashwani K. Korpal, Stockport, all of England

[73] Assignee: International Computers Limited, London, England

[21] Appl. No.: 315,827

[22] Filed: Sep. 30, 1994

[30] Foreign Application Priority Data

Nov. 23, 1993 [GB] United Kingdom ............... 9324040

[51] Int. Cl.$^6$ ............................ G06F 13/00; G06F 15/17
[52] U.S. Cl. ................ 395/311; 395/775; 340/825.79; 370/54; 364/260; 364/238.2; 364/241.9; 364/DIG. 1
[58] Field of Search ..................... 395/325, 800, 395/200, 775, 425; 370/60.1, 94.1, 60, 54; 340/825.5, 825.06, 825.79; 379/381

[56] References Cited

U.S. PATENT DOCUMENTS

| | | |
|---|---|---|
| 4,349,870 | 9/1982 | Shaw et al. ............................ 395/800 |
| 4,523,273 | 6/1985 | Adams, III et al. .................... 395/800 |
| 4,701,906 | 10/1987 | Ransom et al. .......................... 370/60 |
| 4,714,922 | 12/1987 | Cripps et al. ........................... 340/825 |
| 5,001,706 | 3/1991 | Dighe et al. ........................... 370/94.1 |
| 5,083,308 | 1/1992 | Gaulke et al. .......................... 379/381 |
| 5,113,390 | 5/1992 | Hayashi et al. .......................... 370/65 |
| 5,396,638 | 3/1995 | Kanekura ............................... 395/775 |
| 5,404,461 | 4/1995 | Olnowich et al. ...................... 395/325 |

*Primary Examiner*—Gopal C. Ray
*Attorney, Agent, or Firm*—Lee, Mann, Smith, McWilliams, Sweeney & Ohlson

[57] ABSTRACT

A data switch interconnects a number of data processing nodes. The switch includes a number of port units for interfacing with the processing nodes, a number of multiplexing units for performing the switching, and a connection control unit. When a port unit wishes to initiate a connection, it sends a connection command over a command bus to all the multiplexing units and to the connection control unit, specifying a proposed data connection. Each multiplexing unit responds to the connection command by preparing the proposed data connection. At the same time, the connection control unit checks whether the proposed data connection is permissible. If it is permissible, the connection control unit then sends a GO signal to all the multiplexing units instructing them to complete the prepared connection.

3 Claims, 3 Drawing Sheets

DATA SWITCH WITH MULTIPLEXERS FOR FORMING DATA CONNECTIONS AND CONTROL UNIT FOR CHECKING PERMISSIBILITY OF CONNECTIONS

BACKGROUND OF THE INVENTION

This invention relates to data switching apparatus, for interconnecting a number of data processing nodes.

There is a requirement for a data switch that can reliably handle connections between a number of data processing nodes, at high speed.

The object of the invention is to provide a data switch of novel construction, which is capable of solving this problem.

SUMMARY OF THE INVENTION

According to the invention there is provided data switching apparatus comprising:

(a) a command bus, (b) a plurality of port units connected to the command bus, each port unit including means for sending a connection command on the command bus specifying source and destination ports for a required data connection, (c) a plurality of multiplexing units connected to the command bus, each multiplexing unit being arranged to respond to a connection command on the bus by preparing a data connection between the ports specified by that command, and (d) a connection control unit connected to the command bus, for checking whether the data connection specified by the connection command is permissible and, if it is permissible, sending a control signal to all the multiplexing units instructing them to complete the prepared connection.

As will be seen, the invention allows preparation of a data connection to proceed in parallel with checking whether the connection is permissible, thus leading to faster operation.

DESCRIPTION OF AN EMBODIMENT OF THE INVENTION

One data switch in accordance with the invention will now be described by way of example with reference to the accompanying drawings.

Figure 1:
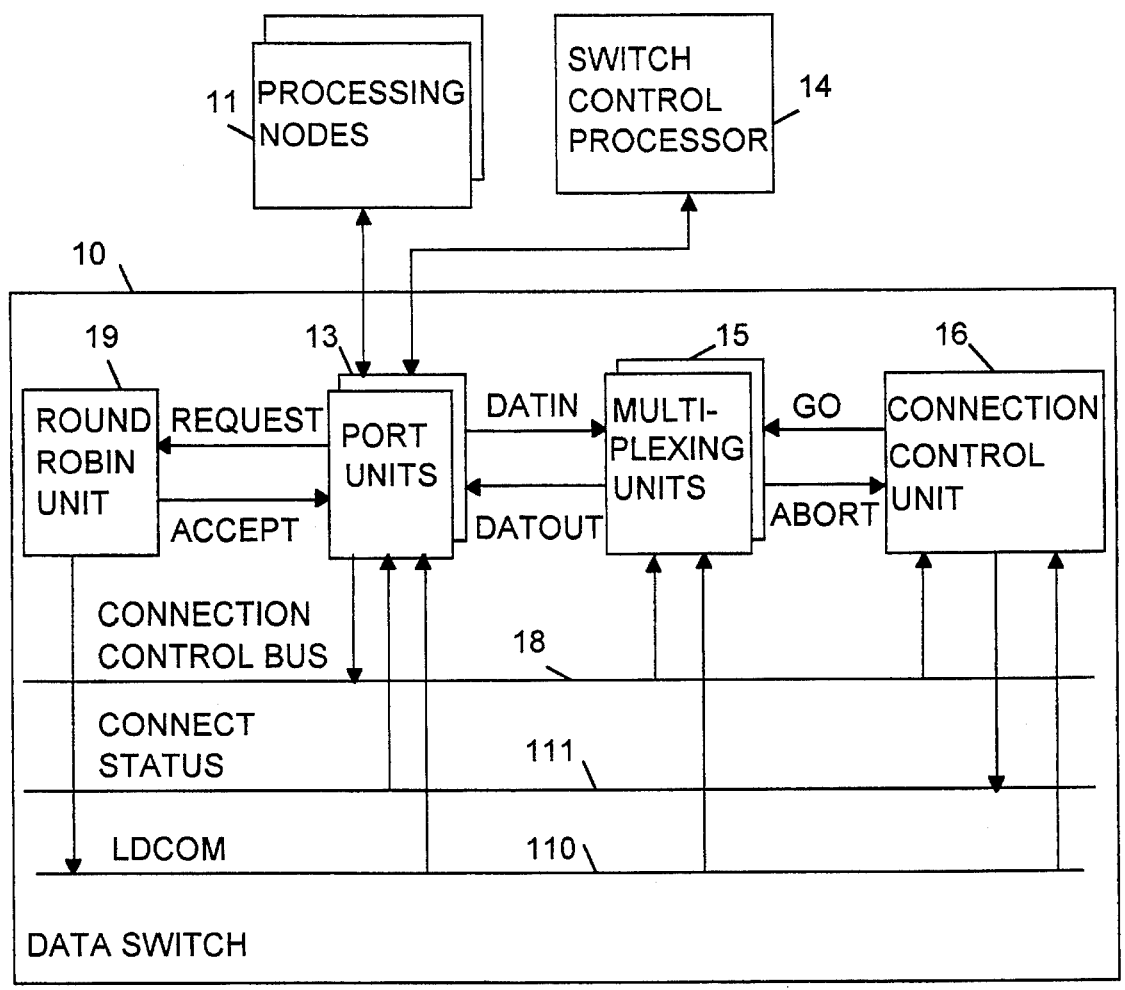
FIG. 1 is an overall block diagram of a data switch embodying the invention.

Referring to FIG. 1, this shows a data processing system comprising a data switch 10 which connects up to sixty data processing nodes 11, allowing the data processing nodes to exchange data with each other. Each of the data processing nodes 11 is connected to the data switch by way of a fibre optic serial data channel 12.

The data switch is controlled by a 50 nanosecond system clock which is distributed to all the units in the switch.

The data switch comprises sixty three port units 13. One of these port units, referred to herein as the control port, is connected to a switch control processor 14. Another sixty of the port units are respectively connected to the fibre optic data channels 12, so that they can receive data from and send data to the data processing nodes 11. The remaining two port units are spare.

The data switch deals with two different types of connection between the ports: static and dynamic. A dynamic connection can be created or removed in response to information received at a port from any of the processing nodes, over one of the data channels. A static connection can be created or removed only in response to action by the control processor 14. For simplicity, only dynamic connections will be considered.

The data switch also includes eleven multiplexing units (MPUs) 15, each of which has 64 input and 64 output lines, connected to respective port units. Each MPU is effectively a 64×64 crossbar switch, capable of connecting any of its 64 input lines to any of its 64 output lines. Up to 64 different data connections may exist simultaneously in each MPU at any given time, so as to provide up to 32 simultaneous bi-directional connections.

Ten of the MPUs are used to form 10-bit wide parallel data connections between selected pairs of port units. The eleventh MPU, referred to herein as the port status MPU, is used for switching status data. This unit receives an OPERABLE signal from each of the port units, indicating whether that unit is operable. If a port unit which has been selected as the destination port for a connection is not operable, the port status MPU generates an ABORT signal output. The ABORT signal is fed to the other ten MPUs, and causes the proposed connection to be abandoned. The port status MPU also sends a CONNECTED status signal to each of the port units to indicate the static connection status of that port.

The data switch also includes a connection control unit (CCU) 16. As will be described, this checks whether a proposed connection set up in the MPUs is permitted or prohibited. If the proposed connection is permitted, the CCU sends a GO signal to all the MPUs 15, enabling the connection. The control unit also receives the ABORT signal from the port status MPU.

The port units and MPUs are all connected to a 24-bit connection control bus 18. When one of the port units wishes to send a command on this bus, it first sends a REQUEST signal to a round-robin unit 19. The round-robin unit arbitrates between competing requests on a cyclic priority basis, and grants access to one of the requesting units by sending it an ACCEPT signal. The round-robin unit also generates a LDCOM (load command) signal, which indicates the start of each bus cycle, and which is sent on line 110 to all the port units, MPUs, and the CCU. Each bus cycle is 150 nanoseconds long, i.e. three clock cycles. The port unit that receives the ACCEPT signal places its command on the bus at the next LDCOM signal.

Each command consists of 24 bits, and has one of two possible formats, depending on the value of the first bit (bit0). If bit0=0 the command is interpreted as follows:

| bits | description |
| --- | --- |
| 1 | parity of bits 0 and 2–9. |
| 2–9 | function code. |
| 10 | parity of bits 11–16. |
| 11–16 | source address (SA). |
| 17 | parity of bits 18–23. |
| 18–23 | destination address (DA). |

The function codes include the following:

| code(hex) | function |
|---|---|
| 00 | null |
| 01 | make dynamic connection |
| 02 | break dynamic connection |
| 03 | make static connection |
| 04 | break static connection |
| 05 | set port busy |
| 06 | clear port |
| 0F | control unit interrupt |
| C0 | assign port 0 |
| to | ... |
| FE | assign port 62 |

Functions 01 and 02 instruct the MPUs to make or break a dynamic connection between two ports. The source address and destination address fields of the command specify the virtual port addresses of the two ports to be connected. Similarly, functions 03 and 04 instruct the MPUs to make or break a static connection. These functions 03 and 04 may only be sent by the control port, since only the control processor may initiate a static connection.

Function 05 instructs the MPUs to mark a particular port unit as busy, and function 06 instructs the MPUs to clear the busy status of a specified port. In both cases, the source address and destination fields of the command specify the physical port number of the port in question.

Function 0F sends an interrupt signal to the control processor. This command may only be sent to the control port.

The CCU and each of the MPUs includes translation RAMs (Random Access Memories) for converting the logical source and destination addresses SA and DA in a received command into corresponding physical port numbers SP and DP. Functions C0–CF are used for writing data into these translation RAMs. The function code itself indicates the physical port number, while the source and destination address fields of the command both contain the virtual port address to be written into the tables. These functions may only be sent from the control port.

The CCU also contains prohibit RAMs, which indicate whether a proposed connection between source and destination addresses SA and DA is permitted or prohibited. If bit0=1, the command is interpreted as a MODIFY PDCM command, for updating the prohibit RAMs. This command has the following format:

| bits | contents |
|---|---|
| 1 | parity of bits 0 and 2–9. |
| 2–9 | new value to be written into prohibit RAM. |
| 10 | parity of bits 11–16. |
| 11–16 | port address, for addressing the prohibit RAMs. |
| 17 | parity of bits 18–23. |
| 18–23 | mask address, for selecting one of the eight RAMs. |

The CCU also includes a connection status RAM, addressed by the physical port numbers SP, DP. The connection status RAM contains an entry for each port. Each entry indicates whether or not the port is connected and, if connected, the address of the port to which it is connected and the nature of the connection (static or dynamic).

The CCU is connected by way of a 5-bit CONNECT STATUS bus 111 to all the port units. This bus carries a code indicating the response of the CCU to each command; i.e. whether the command was successful and, if not, the reason for the failure. The CONNECT STATUS code has one of the following values:

| Code | Description |
|---|---|
| 0 | null |
| 1 | command successful |
| 2 | connection is static |
| 3 | connection is prohibited |
| 4 | destination port is busy |
| 5 | source port is busy |
| 6 | address invalid |
| 7 | destination address is undefined |
| 8 | command parity failure |
| 9 | connection unidentified |
| A | static connection successful |

Connection Control Unit

Figure 2:
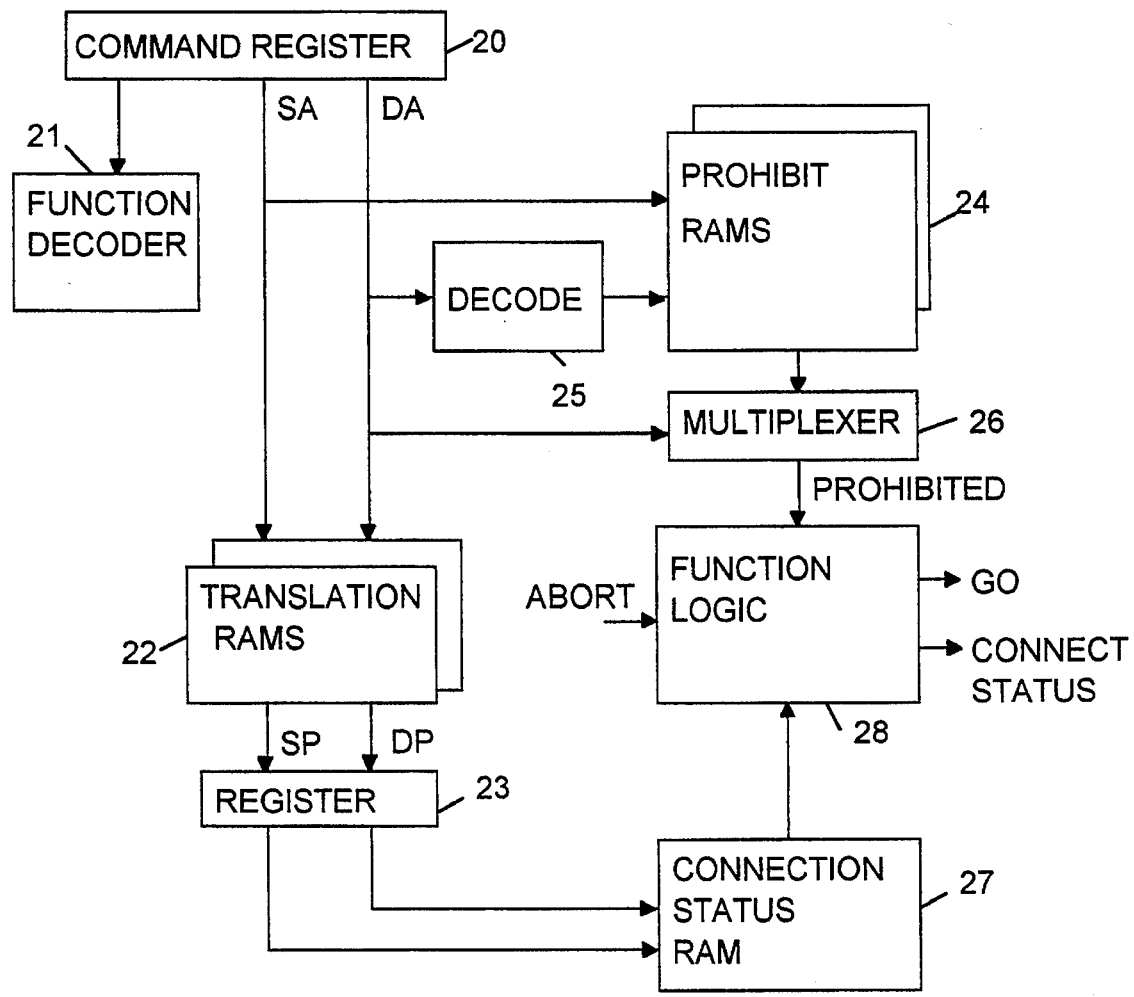
FIG. 2 is a block diagram of a connection control unit.

FIG. 2 shows the CCU in more detail.

Commands from the connection control bus are received in a command register 20. The function code of the command is decoded by a decoder 21. The source and destination addresses SA, DA are translated into port numbers SP, DP by means of two 64-word by 9-bit translation RAMs 22. Each word in these RAMs holds a 6-bit physical port number and one parity bit, the remaining two bits being unused. The port numbers are stored in a register 23.

The CCU also has eight 64 word by 9 bit prohibit RAMs 24. Each word contains 8 data bits and one parity bit. These RAMs are accessed to check whether a proposed connection between the source and destination addresses SA, DA specified by the command is permitted or prohibited. The source address SA is fed in parallel to the address inputs of all eight RAMs so as select one word in each RAM. The first three bits of the destination address DA are decoded in a decoder 25 and used to select one of the eight RAMs. The last three bits of the destination address DA control a multiplexer 26 so as to select one output data bit from the selected RAM. The selected bit indicates whether or not a dynamic connection is permitted between the specified source and destination.

The CCU also has a 128 word by 9 bit connection status RAM 27, addressed by the physical port numbers SP, DP. Each word in this RAM corresponds to a particular physical port. The first 6 bits of each word contain the address of the port to which the port in question is connected. If the port is not connected, the default value for these bits is 3F. The next bit is a code indicating whether or not the port is statically connected. The next bit is a parity bit for the preceding bits. The last bit is unused.

The CCU also includes a function logic circuit 28 which receives the decoded function code, the outputs of the prohibition RAMs and connection status RAM, and the ABORT signal from the port status MPU. In response to these inputs, the logic circuit decides whether or not to produce a GO signal to permit the MPUs to complete the command.

Multiplexing Unit

Figure 3:
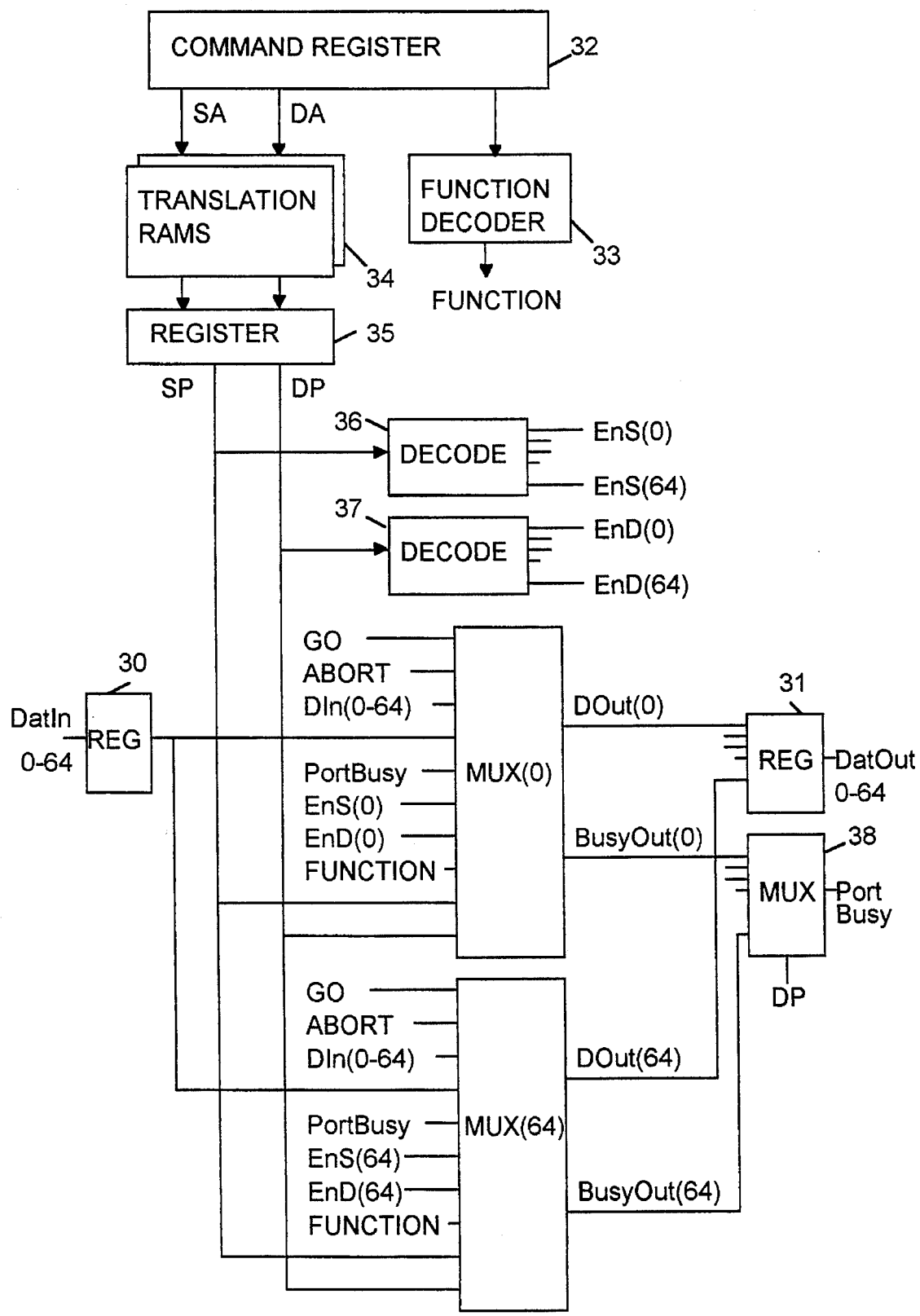
FIG. 3 is a block diagram of a multiplexing unit.

FIG. 3 shows one of the MPUs in more detail.

The MPU unit receives a 64-bit data input signal DatIn(0)-DatIn(64), in an input data register 30, and produces a 64-bit data output signal DatOut(0)-DatOut(64) from an output data register 31. DatIn(i) comes from the ith port unit, while DatOut(j) is supplied to the jth port unit.

The MPU comprises 64 multiplexers MUX(0)-MUX(63). Each multiplexer includes a 6-bit mark register, which controls the multiplexer to select one of the 64 data inputs DatIn(0)-DatIn(64). The output of multiplexer MUX(j) provides the data output bit DatOut(j). The set of multiplexers thus act effectively as a 64×64 crossbar switch for connecting any pair of ports. Two of the multiplexers are used to set up each bi-directional connection: one multiplexer to connect output data from the source port to the input of the destination port, and one multiplexer to connect output data from the destination port to the input of the source port.

Each multiplexer MUX also includes a Busy flag, which is set whenever the multiplexer is currently handling a dynamic connection, and an Sbusy flag, which is set whenever the multiplexer is currently handling a static connection. Each multiplexer produces a signal BusyOut which is asserted if the multiplexer is busy handling a connection.

The MPU also includes a command register 32 for receiving commands from the connection control bus. The function code of the command is decoded in a decoder 33.

The MPU also includes two address translation RAMs 34, for translating source and destination addresses SA, DA into corresponding physical source and destination port numbers SP and DP. These port numbers SP,DP are stored in a register 35.

The port numbers SP and DP are decoded by two 6-to-64 decoders 36, 37 to produce a set of 64 source enable signals EnS(0)–EnS(63) and a set of 64 destination enable signals EnD(0)–EnD(63). These enable signals are fed respectively to the correspondingly numbered multiplexers: signal EnS(i) is fed to multiplexer MUX(i), while signal EnD(j) is fed to multiplexer MUX(j). Only one signal from each set is asserted at any given time according to the values of SP and DP: if SP=i then EnS(i) is asserted, and if DP=j then EnD(j) is asserted. The signal EnS(i), when asserted, enables loading of the destination port number DP into the mark register of multiplexer MUX(i). Similarly, the signal EnD(j), when asserted, enables loading of the source port number SP into the mark register of multiplexer MUX(j).

The destination port number DP also controls a multiplexer 38 which selects the BusyOut signal from the destination multiplexer, to provide a signal PortBusy which indicates that the destination port of a proposed connection is busy.

Operation

For simplicity, only the MAKE DYNAMIC CONNECTION and BREAK DYNAMIC CONNECTION commands will be considered here; it is not necessary for an understanding of the invention to consider the other commands.

As mentioned, at the start of each bus cycle, when LDCOM is asserted, one of the port units places a command on the connection control bus. The CCU and the MPUs then read this command from the bus into their command registers 20, 32. Each unit checks the parity of the command, and if a parity failure is detected, the command is aborted. Assuming the command is not aborted, the CCU and each of the MPUs then decodes the function code of the command, and at the same time accesses its translation RAMs 22, 34 to translate the logical source and destination addresses SA and DA in the command into corresponding physical port numbers SP and DP.

Make Dynamic Connection

If the command is a MAKE DYNAMIC CONNECTION command, the operation proceeds as follows.

Each of the MPUs decodes the port numbers SP, DP in decoders 36, 37 to produce signals EnS and EnD. These signals select a pair of multiplexers MUX for forming the required bi-directional connection. The MPU also checks whether the proposed connection is already busy and, if so, abandons the command.

At the same time, the CCU accesses its prohibit RAMs 24, to check whether a connection is permitted between the specified source and destination. It then determines whether the following conditions are met:

there was no parity failure in the translation RAMs, the destination address is defined, the source and destination addresses are both valid, and the connection is not prohibited, If these conditions are all met, the CCU sends a GO signal to all the MPUs.

When each MPU receives this GO signal, it loads the port numbers SP, DP into the mark registers of the selected pair of multiplexers MUX, and these multiplexers are then enabled, completing the required connection. However, if the ABORT signal is asserted at the next again clock beat, the connection is broken. If ABORT is not asserted, the connection is held enabled until it is broken by a subsequent command.

After sending a GO signal, the CCU accesses its connection status RAM 27 to check the status of the required connection. It then determines whether the following conditions are met:

there was no parity failure in the connection status RAM, the connection is not already busy due to a dynamic link, the destination port is not statically connected, and the ABORT signal was not asserted.

If these conditions are all met, the CCU creates an entry for the new connection in the connection status RAM, and places a "command successful" code on the CONNECT STATUS bus. Otherwise, it places a code indicating the reason for the failure on the CONNECT STATUS bus.

Break Dynamic Connection

If the command is a BREAK DYNAMIC CONNECTION command, the operation proceeds as follows.

Each of the MPUs decodes the port numbers SP, DP in decoders 36, 37 to produce signals EnS and EnD. These signals select the pair of multiplexers MUX that form the bi-directional connection to be broken.

At the same time, the CCU determines whether the following conditions are met:

there was no parity failure in the translation RAMs, the destination address is defined, and the source and destination addresses are both valid.

If these conditions are all met, the CCU sends a GO signal to all the MPUs.

When each MPU receives this GO signal, it disables the selected pair of multiplexers MUX, so as to break the connection.

After sending a GO signal, the CCU accesses its connection status RAM to check the current connection status. It then determines whether the following conditions are met:

there was no parity failure in the connection status RAM, the connection exists, and the destination port is not statically connected.

If these conditions are all met, the CCU clears the entry for the connection from the connection status RAM, and places a "command successful" code on the CONNECT STATUS bus. Otherwise, it places a code indicating the reason for the failure on the CONNECT STATUS bus.

It will be appreciated that many modifications may be made to the system described above without departing from the scope of the invention as defined in the claims.

We claim:

1. Data switching apparatus comprising:
   (a) a plurality of input data channels and a plurality of output data channels;
   (b) a command bus;
   (c) means for sending a connection command on said command bus, said connection command specifying one of said input data channels as a source channel and specifying one of said output data channels as a destination channel for a proposed data connection;
   (d) a plurality of multiplexing units connected to said input data channels, to said output data channels, and to said command bus, each of said multiplexing units comprising means for responding to said connection command, if said proposed connection is not already busy, by preparing said proposed data connection between said source channel and said destination channel, but without completing said connection; and
   (e) a connection control unit connected to said command bus, said connection control unit comprising means for responding to said connection command by checking whether said proposed data connection is permissible and, if said proposed data connection is permissible, for sending a go-ahead signal to all of said multiplexing units;
   (f) wherein each of said multiplexing units further includes means connected to receive said go-ahead signal from said connection control unit and for responding to said go-ahead signal by connecting said source channel to said destination channel, thereby completing said proposed data connection.

2. Apparatus according to claim 1 wherein said connection control unit includes random-access memory means for storing information indicating, for each possible connection between said input data channels and said output data channels, whether that possible connection is prohibited.

3. A computer system comprising a plurality of processing nodes, and switching apparatus for interconnecting said processing nodes to permit exchange of data between said processing nodes, wherein the switching apparatus comprises:
   (a) a plurality of input data channels and a plurality of output data channels, said input channels and output channels being connected to said processing nodes;
   (b) a command bus;
   (c) means for sending a connection command on said command bus, said connection command specifying one of said input data channels as a source channel and specifying one of said output data channels as a destination channel for a proposed data connection;
   (d) a plurality of multiplexing units connected to said input data channels, to said output data channels, and to said command bus, each of said multiplexing units comprising means for responding to said connection command, if said proposed connection is not already busy, by preparing said proposed data connection between said source channel and said destination channel, but without completing said connection; and
   (e) a connection control unit connected to said command bus, said connection control unit comprising means for responding to said connection command by checking whether said proposed data connection is permissible and, if said proposed data connection is permissible, for sending a go-ahead signal to all of said multiplexing units;
   (f) wherein each of said multiplexing units further includes means connected to receive said go-ahead signal from said connection control unit and for responding to said go-ahead signal by connecting said source channel to said destination channel, thereby completing said proposed data connection.

\* \* \* \* \*